(12) United States Patent
O'Connor

(10) Patent No.: US 8,617,261 B2
(45) Date of Patent: Dec. 31, 2013

(54) LIQUID FUEL FROM AQUATIC BIOMASS

(75) Inventor: Paul O'Connor, Hoevelaken (NL)

(73) Assignee: KiOR, Inc., Pasadena, TX (US)

( * ) Notice: Subject to any disclaimer, the term of this patent is extended or adjusted under 35 U.S.C. 154(b) by 351 days.

(21) Appl. No.: 12/666,338

(22) PCT Filed: Jun. 24, 2008

(86) PCT No.: PCT/EP2008/058031
§ 371 (c)(1),
(2), (4) Date: Aug. 12, 2010

(87) PCT Pub. No.: WO2009/000838
PCT Pub. Date: Dec. 31, 2008

(65) Prior Publication Data
US 2010/0293838 A1    Nov. 25, 2010

Related U.S. Application Data

(60) Provisional application No. 60/929,374, filed on Jun. 25, 2007.

(51) Int. Cl.
*C10L 1/00* (2006.01)
*C10L 5/00* (2006.01)

(52) U.S. Cl.
USPC ................................. 44/307; 44/605; 44/606

(58) Field of Classification Search
USPC .......................................... 44/307, 605, 606
See application file for complete search history.

(56) References Cited

U.S. PATENT DOCUMENTS 5,227,136 A * 7/1993 Hanify et al. ................. 422/225
2009/0308787 A1* 12/2009 O'Connor et al. .............. 208/44

FOREIGN PATENT DOCUMENTS

| EP | 1719811 | 11/2006 |
| EP | 1719811 A1 * | 11/2006 |
| EP | 1970425 | 9/2008 |
| JP | 04110395 | 4/1992 |
| JP | 6041545 | 2/1994 |

OTHER PUBLICATIONS

International Search Report from related PCT Patent Application No. PCT/EP2008/058031, filed on Jun. 24, 2008; 5 Pages.
Minowa et al: "Preparation of Heavy . . . Heavy Oil-like Material", Thompson Scientific, Longon GB, NR 12, 1994, vol. 1994, XP002506089.

* cited by examiner

*Primary Examiner* — James Goloboy
*Assistant Examiner* — Latosha Hines
(74) *Attorney, Agent, or Firm* — Hovey Williams LLP

(57) ABSTRACT

A process is disclosed for converting aquatic biomass to a bio-oil. The process comprises mixing the aquatic biomass with a particulate catalytic material; subjecting the aquatic biomass to a catalytic cracking reaction to form a reaction mixture comprising a bio-oil; and isolating the bio-oil from the reaction mixture. Preferably the process is integrated with a plant for producing aquatic biomass, so that heat and $CO_2$ generated during the process may be used in the production of aquatic biomass.

16 Claims, No Drawings

LIQUID FUEL FROM AQUATIC BIOMASS

BACKGROUND OF THE INVENTION

1. Field of the Invention

The invention relates generally to the production of liquid fuels from aquatic biomass, and more particularly to improved processes for producing aquatic biomass and for converting aquatic biomass to bio-oil, which can be used as a burning fuel, or in turn can be refined to fuels for internal combustion engines.

2. Description of the Related Art

Aquatic plants, such as algae, are a source of lipids, such as triglycerides and aliphatic hydrocarbons; carbohydrates, such as lignin; and proteins.

The advantage of using micro algae is that they have very high growth rates, utilize a large fraction of the solar energy (up to 10% of the solar energy), and can grow in conditions that are not favorable for terrestrial biomass growth.

The U.S. Department of Energy funded a program to develop renewable transportation fuels from algae, and the results of this program are reported by Sheehan et al. [1] Over 3000 strains of micro algae were collected as part of this program. Micro algae are one of the most primitive forms of plants and are microscopic photosynthetic organisms. While the photosynthesis mechanism in algae is similar to other plant material, they can convert much more of their solar energy into cellular structure (up to 10% instead of maximum 1% by terrestrial sources).

Macro algae are commonly known as seaweed. Both micro algae and macro algae are fast-growing marine and freshwater plants. Commercial production of triglycerides from micro algae has been estimated to be 72 000 L/ha-year (390 boe/ha-year), and it has been estimated that rates as high as 130 000 L/ha-year (700 boe/ha-year) could be accomplished.

This means that algae have triglyceride production rates 45-220 times higher than terrestrial biomass. Other estimates indicate that 2000 ha of land would be required to produce 1 EJ/year of fuel with micro algae. For comparison, the U.S. consumed 42 EJ of petroleum products in 2003.

Micro algae are categorized into four major classes in terms of their abundance: diatoms, green algae, blue-green algae, and golden algae. Micro algae can contain from 7 to 60 dry wt triglycerides.

Pilot plant tests [2], conducted over a six-year period, demonstrate that micro algae could be produced at productivity rates as high as 500 kg algae/ha in a 1000 m² pond for a single day. The ponds were an open face shallow water design where the water and algae are circulated around the pond. Nutrients and CO2 were continually added to the algae pond. The productivity was dependent on temperature and sunlight, which varied over the course of the experiments. Ideally, algae could be produced on algae farms in open, shallow ponds where a waste source of $CO_2$, for example, from a fossil fuel power plant, could be efficiently bubbled into the ponds and captured by the algae.

The current limitation of micro algae is the high production cost. The total biomass algae cost is in the order of 200 to 300 $/metric ton, which is considerably higher than the cost of lignocellulosic biomass (less than $40/metric ton). The cost for $CO_2$ is 20-30% of the total cost, and using waste $CO_2$ from fossil fuel power plants would decrease the cost of algae production.

The conclusions from the cost analysis [1,2] is that alternative engineering designs for micro algae production would not significantly reduce the cost of micro algae production. The limiting factor in cost analysis is micro algae cultivation issues, and according to Sheehah [1] future research work should focus on the biological issues regarding micro algae production. Micro algae cultivation issues are limited by the availability of water, $CO_2$, sun light, and flat land. The development of low-cost harvesting processes can also significantly reduce the cost of algae.

Thus, there is a particular need for improving the efficiency of the conversion of aquatic biomass to bio-oil.

BRIEF SUMMARY OF THE INVENTION

The present invention addresses these problems by providing a method for converting aquatic biomass to bio-oil, said method comprising the steps of:
  a) contacting the aquatic biomass with a particulate catalyst material;
  b) catalytically cracking the biomass at elevated temperature, whereby a reaction mixture is formed containing a bio-oil;
  c) isolating the bio-oil from the reaction mixture.

DESCRIPTION OF ILLUSTRATIVE EMBODIMENTS

The following is a description of certain embodiments of the invention, given by way of example only.

The present invention focuses on a main factor responsible for the high cost of liquid fuel from aquatic biomass, the high cost of converting aquatic biomass to bio-oil.

As used herein the term "aquatic biomass" refers to biomass produced in an aquatic environment by a photosynthesis process. The most common form of aquatic biomass is obtained from growing algae.

As compared to land-based plants, algae are highly efficient in the photosynthesis process. In photosynthesis, $CO_2$ is converted to hydrocarbons under the influence of sun light. The common catalyst used by plants in the photosynthesis process is chlorophyll. Plants do not need direct sun light for the photosynthesis process; the process takes place in indirect sun light, such as when the sky is overcast, be it more slowly than in direct sun light.

Algae contain considerable amounts of lipids; depending on the species, up to 40%. The lipids comprise both glycerides (triglycerides, diglycerides and monoglycerides), and aliphatic hydrocarbons. It has been proposed to separate these lipids from the rest of the biomass, and use it as a source of biodiesel fuel.

Even in the best of cases, this approach uses only up to 40% of the aquatic biomass, and no economically viable uses for the remaining biomass exist to date.

As can be seen from Table 1, the remainder of the biomass consists primarily of protein and carbohydrates.

TABLE 1

Chemical Composition of Algae Expressed on A Dry Matter Basis (%)

| Strain | Protein | Carbohydrates | Lipids | Nucleic acid |
|---|---|---|---|---|
| Scenedesmus obliquus | 50-56 | 10-17 | 12-14 | 3-6 |
| Scenedesmus quadricauda | 47 | — | 1.9 | — |
| Scenedesmus dimorphus | 8-18 | 21-52 | 16-40 | — |
| Chlamydomonas rheinhardii | 48 | 17 | 21 | — |
| Chlorella vulgaris | 51-58 | 12-17 | 14-22 | 4-5 |
| Chlorella pyrenoidosa | 57 | 26 | 2 | — |
| Spirogyra sp. | 6-20 | 33-64 | 11-21 | — |
| Dunaliella bioculata | 49 | 4 | 8 | — |

TABLE 1-continued

Chemical Composition of Algae Expressed on A Dry Matter Basis (%)

| Strain | Protein | Carbohydrates | Lipids | Nucleic acid |
|---|---|---|---|---|
| Dunaliella salina | 57 | 32 | 6 | — |
| Euglena gracilis | 39-61 | 14-18 | 14-20 | — |
| Prymnesium parvum | 28-45 | 25-33 | 22-38 | 1-2 |
| Tetraselmis maculata | 52 | 15 | 3 | — |
| Porphyridium cruentum | 28-39 | 40-57 | 9-14 | — |
| Spirulina platensis | 46-63 | 8-14 | 4--9 | 2-5 |
| Spirulina maxima | 60-71 | 13-16 | 6-7 | 3-4.5 |
| Synechoccus sp. | 63 | 15 | 11 | 5 |
| Anabaena cylindrica | 43-56 | 25-30 | 4-7 | — |

Source: Becker, (1994)

An optimized process uses all three components (protein, carbohydrates and lipids) as a source for bio-oil. The present invention provides a method for converting aquatic biomass to bio-oil, said method comprising the steps of:
  a) contacting the aquatic biomass with a particulate catalyst material;
  b) catalytically cracking the biomass at elevated temperature, whereby a reaction mixture is formed containing a bio-oil;
  c) isolating the bio-oil from the reaction mixture.

Preferably this process is preceded by the step of (partially) dewatering the aquatic biomass. This step may comprise collecting water containing the biomass on a screen, and allowing water to run off.

Depending on the plant species used, the biomass may desirably be chopped or comminuted prior to or during the step of contacting the biomass with the particulate catalytic material. In a preferred embodiment the aquatic biomass is co-milled with the particulate catalytic material, for example in a kneader.

Preferred particulate catalytic materials are those are those comprising an inorganic oxide. Suitable examples include natural and synthetic clays; oxides and hydroxides of aluminum, magnesium, calcium; alumina/magnesia mixtures; meixnerites; hydrotalcite and hydrotalcite-like materials; and mixtures thereof Hydrotalcite and hydrotalcite-like materials are particularly preferred.

The particle size of the particulate catalyst material preferably ranges from about 10 nm to about 1 mm; preferably the particle sizes range from about 100 nm to about 10 micrometers.

The mixture of aquatic biomass and particulate catalyst material is subjected to a catalytic cracking step. This step is carried out at a temperature between 200 and 350° C. in an oxygen free or oxygen poor atmosphere. Suitably the catalytic cracking step may be conducted in an inert atmosphere, for example steam or nitrogen. Desirably, this step may be conducted in a reducing atmosphere comprising hydrogen. Although the use of hydrogen increases the cost of the process, it improves the quality of the resulting bio-oil, in particular if the lipid component of the biomass is rich in unsaturated fatty acids.

In many cases gas is formed in the catalytic cracking step. Preferably such gas is collected from the reaction mixture. This gas may be used as a fuel for providing at least part of the heat required for the catalytic cracking step.

In many cases the catalytic cracking reaction results in the deposition of coke onto the particulate catalytic material. Such coke may be removed by burning it off the particulate catalytic material in a catalyst regeneration step. Heat produced in this regeneration step may be used in the catalytic cracking process.

In a preferred embodiment the process of the present invention is integrated with the production of aquatic biomass, and heat produced during this process may be used in the production of the biomass, for example by heating the water in which the aquatic biomass is grown. Also, $CO_2$ produced in, for example, the catalyst regeneration step may be used in the process for producing the aquatic biomass. For example, $CO_2$ may be bubbled through the water in which the aquatic biomass is grown.

Other than any coke deposited on the catalyst particles and inorganic materials present in the aquatic biomass (ashes), the process produces no solid by-products. Coke may be burned off, as described hereinabove. Ashes may be dissolved in water or in an aqueous solution of an acid, and separated from the catalytic particles. In general the ashes contain materials, such as KOH, that have suitable catalytic properties. It may be desirable to leave the ashes mixed with the catalytic particles and recycle the mixture of ashes and particulate catalytic materials into step a) of the process.

The liquid product obtained in step b) of the process comprises an aqueous phase and an oil phase. The liquid phase contains dissolved inorganic materials from the aquatic biomass starting material, and dissolved organic reaction products, such as sugars, carboxylic acids, oligopeptides, and the like.

The oily phase is a complex mixture of hydrophobic organic materials, such as unconverted lipids, fatty acids, aliphatic hydrocarbons, carbohydrates, fatty alcohols, aromatics, and the like.

The oily phase may be separated from the aqueous phase by gravity. It may be used as-is as a furnace fuel, or it may be subjected to conventional refining steps (hydrocracking, hydrotreatment, and the like) to generate liquid fuels suitable for use in internal combustion engines.

Organic materials present in the aqueous phase may be separated in any suitable way, such as distillation, extraction, film evaporation, and the like. The organic materials may be blended with the oily phase prior to refining, or may be used for further upgrading to specialty chemicals.

What is claimed is:

1. A method for converting aquatic biomass to bio-oil, said method comprising the steps of:
  a) contacting the aquatic biomass with a particulate catalyst material;
  b) catalytically cracking the aquatic biomass at elevated temperature, whereby a reaction mixture is formed containing a bio-oil; and
  c) isolating the bio-oil from the reaction mixture;
  wherein step a) is preceded by the step of at least partially dewatering the aquatic biomass,
  wherein the dewatering comprises collecting water containing the aquatic biomass with a screen and allowing the water to run off the screen.

2. The method of claim 1, wherein step a) comprises milling the aquatic biomass with the particulate catalytic material.

3. The method of claim 1 wherein the particulate catalyst material comprises an inorganic oxide.

4. The method of claim 3 wherein the particulate catalyst material is hydrotalcite.

5. The method of claim 1 wherein the particulate catalyst material has a mean particle size in the range of from 1 mm to 10 nm.

6. The method of claim 1 whereby step b) is carried out at a temperature in the range of from 200 to 350° C.

7. The method of claim 1 whereby gas is formed in step b) and the gas is collected from the reaction mixture.

8. The method of claim 1 wherein coke is formed on the particulate catalyst material.

9. The method of claim 8 comprising the additional step of:
   d) burning the coke off the particulate catalyst material.

10. The method of claim 9 which is integrated with a production process of aquatic biomass, and wherein $CO_2$ produced in step d) is utilized in the production process of aquatic biomass.

11. The method of claim 9 wherein heat produced in step d) is utilized in the production process of aquatic biomass.

12. The method of claim 1 wherein the isolating of step c) comprises separating the bio-oil from an aqueous phase.

13. The method of claim 12 wherein the separating is performed by gravity.

14. The method of claim 12 wherein the aqueous phase comprises dissolved organic reaction products, further comprising removing the dissolved organic reaction products from the aqueous phase to thereby yield extracted organic reaction products.

15. The method of claim 14 further comprising blending at least a portion of the extracted organic reaction products with at least a portion of the bio-oil to form a refining feedstock.

16. The method of claim 14, further comprising upgrading at least a portion of the extracted organic reaction products to form specialty chemicals.

* * * * *